(12) United States Patent
Maeda et al.

(10) Patent No.: US 7,042,621 B2
(45) Date of Patent: May 9, 2006

(54) MICROMIRROR DEVICE

(75) Inventors: Masanori Maeda, Saitama-ken (JP); Satoshi Karasawa, Saitama-ken (JP); Rogerio Jun Mizuno, Saitama-ken (JP); Naoki Kikuchi, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/036,983

(22) Filed: Jan. 19, 2005

(65) Prior Publication Data
US 2005/0179981 A1 Aug. 18, 2005

(30) Foreign Application Priority Data
Jan. 20, 2004 (JP) .......................... P2004-012237

(51) Int. Cl.
G02B 26/08 (2006.01)
G02B 26/00 (2006.01)
A61B 6/00 (2006.01)

(52) U.S. Cl. ...................... 359/290; 359/291; 359/223; 359/224; 600/473; 600/476

(58) Field of Classification Search ................ 359/290, 359/291, 223, 224, 295, 296, 871; 600/476, 600/473, 600, 101, 160
See application file for complete search history.

(56) References Cited

U.S. PATENT DOCUMENTS 5,799,643 A * 9/1998 Miyata et al. ................ 125/21

(Continued)

FOREIGN PATENT DOCUMENTS

JP 2003-29172 1/2003

(Continued)

OTHER PUBLICATIONS

T.J. Brosnihan et al., The 12th International Conference on Solid State Sensors, Actuators and Microsystems, Boston, Jun. 8-12, 2003, IEEE, 2003, pp. 1638-1642.

(Continued)

Primary Examiner—Timothy Thompson
(74) Attorney, Agent, or Firm—Greenblum & Bernstein, P.L.C.

(57) ABSTRACT

There is provided a micromirror device, which is provided with a mirror layer including a mirror surface which is supported to be rotatable around a first axis passing through a center of the mirror surface, and an upper substrate having transparency including a first upper electrode part and a second upper electrode part arranged on its surface facing the mirror layer to face each other via a first upper boundary passing through a center of the surface and parallel to the first axis, and a lower substrate including a first lower electrode part and a second lower electrode part arranged on its surface facing the mirror layer to face each other via a first lower boundary passing through a center of the surface and parallel to the first axis. The upper substrate is stacked on one side of the mirror layer while securing a first space between the center of the mirror surface and the first and second upper electrode parts, while the lower substrate is stacked on the other side of the mirror layer while securing a second space between the center of the mirror surface and the first and second lower electrode parts. The mirror surface is rotated around the first axis by applying voltage to a pair of the electrodes placed diagonally with respect to the first axis.

2 Claims, 4 Drawing Sheets

U.S. PATENT DOCUMENTS

| | | | |
|---|---|---|---|
| 6,431,714 B1 | 8/2002 | Sawada et al. | 359/879 |
| 6,473,221 B1 * | 10/2002 | Ueda et al. | 359/298 |
| 6,545,260 B1 * | 4/2003 | Katashiro et al. | 250/227.26 |
| 6,633,426 B1 * | 10/2003 | Shrauger et al. | 359/290 |
| 6,891,650 B1 * | 5/2005 | Mizuno et al. | 359/224 |
| 2002/0018276 A1 * | 2/2002 | Suga | 359/212 |
| 2003/0016906 A1 | 1/2003 | Utsunomiya | 385/18 |

FOREIGN PATENT DOCUMENTS

JP 2003-57575 2/2003

OTHER PUBLICATIONS

U.S. Appl. No. 11/042,157, to Mizuno, which was filed Jan. 26, 2005.

* cited by examiner

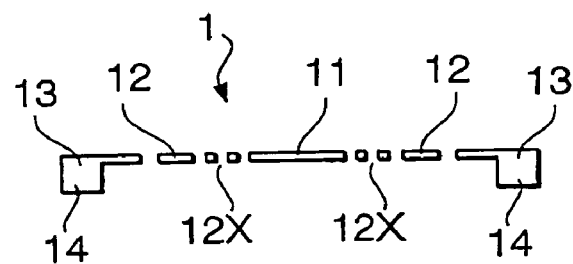
FIG. 3
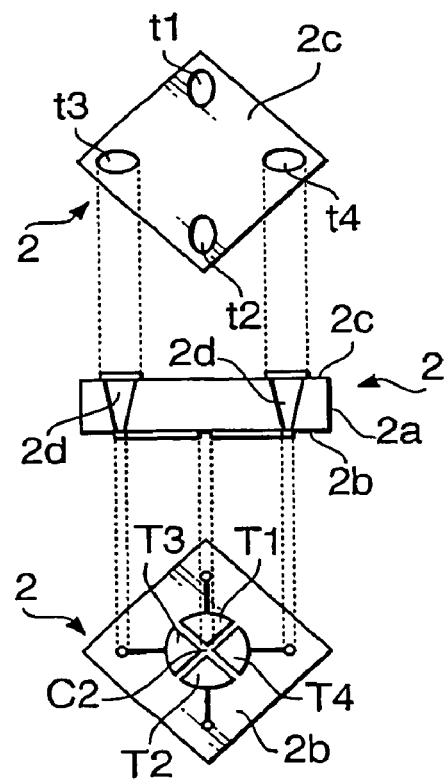
FIG. 4C
FIG. 4A
FIG. 4B
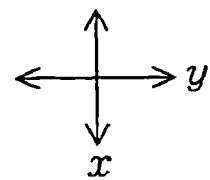

MICROMIRROR DEVICE

BACKGROUND OF THE INVENTION

The present invention relates to a micromirror device of a capacitance type which is used for scanning an optical beam.

Micromirror devices of the capacitance type (hereinafter also referred to simply as "micromirror devices") have widely been used in various technical fields like optical switches for communication, measuring instruments, scanners, etc. In a micromirror device of the capacitance type, a plurality of electrodes are arranged on a substrate which is placed under a mirror scanning an incident beam. By applying voltage to a proper electrode, electrostatic attraction is caused between the electrode and the mirror and thereby the surface of the mirror is tilted in a desired direction. A typical micromirror device has been disclosed in Japanese Patent Provisional Publication No.2003-29172 (hereinafter referred to as a "document No.1"), for example.

In recent years, micromirror devices are being required to secure a wide scan range while achieving miniaturization. To realize a wide scan range, some approaches for increasing the electrostatic attraction for tilting the mirror (enlarging the areas of the electrodes arranged under the mirror, increasing the voltage applied to the electrodes, etc.) can be taken, for example.

However, to realize the miniaturization of the whole device, there is a limit to the enlargement of the areas of electrodes. There is also a limit to the increase of the voltage applied to the electrodes since the load on the mirror surface and ill effects on other elements around the micromirror device increase. Therefore, neither approach is effective for practical use.

Meanwhile, a micromirror device disclosed in Japanese Patent Provisional Publication No.2003-57575 (hereinafter referred to as a "document No.2") aims to miniaturize the whole device and achieves a wide scan range by increasing the electrostatic attraction applied to the mirror by reducing a space between a mirror and electrodes.

SUMMARY OF THE INVENTION

However, if the space between the mirror and the electrodes is designed small as above, a so-called "pull-in" (the tilted mirror sticking to an electrode and getting uncontrollable) might occur. Consequently, the controllable tilt angle becomes small as a matter of course and thereby the scan range is necessitated to be small.

In micromirror devices, a prescribed bias voltage is generally applied to every electrode, that is, certain electrostatic force already exists between the mirror and each electrode before the device is driven for the scanning of the beam. Therefore, if the space between the mirror and the electrodes is reduced as above, even small electrostatic force corresponding to the bias voltage can pull the mirror surface toward the electrodes. If the whole mirror surface is pulled toward the electrodes, that is, if the mirror surface moves parallelly toward the electrodes, an incident position of the beam incident upon the mirror surface shifts from an original position. In such a state, the beam scans positions different from designed scanning positions.

In consideration of the above mentioned problem, the device disclosed in the document No.2 is provided with a pivot (a projection as a supporting point) for supporting the mirror at its center, on the substrate on which the electrodes are arranged, by which the translation (parallel movement) of the mirror surface toward the electrodes is avoided. Further, the micromirror device of the document No.2 employs a substrate having a special step-like configuration in order to prevent the aforementioned pull-in. However, a process for forming such a step-like configuration and pivot on a substrate of the small-sized micromirror device requires extremely high accuracy and high cost. Further, high-precision positioning for placing the pivot at the center of the mirror becomes essential.

The present invention is advantageous in that it provides a micromirror device configured to have a wide scan range while being small-sized and to be manufactured with ease and at a low cost.

In accordance with an aspect of the present invention, there is provided a micromirror device, which is provided with a mirror layer including a mirror surface which is supported to be rotatable around a first axis passing through a center of the mirror surface, and an upper substrate having transparency including a first upper electrode and a second upper electrode arranged on its surface facing the mirror layer to face each other via a first upper boundary passing through a center of the surface and parallel to the first axis, and a lower substrate including a first lower electrode and a second lower electrode arranged on its surface facing the mirror layer to face each other via a first lower boundary passing through a center of the surface and parallel to the first axis. The upper substrate is stacked on one side of the mirror layer while securing a first space between the center of the mirror surface and the first and second upper electrodes, while the lower substrate is stacked on the other side of the mirror layer while securing a second space between the center of the mirror surface and the first and second lower electrodes. The mirror surface is rotated around the first axis by applying voltage to a pair of electrodes, of the first and second upper electrodes and the first and second lower electrodes, placed diagonally with respect to the first axis.

As above, the micromirror device of the present invention employs the electrodes arranged above and below the mirror surface, in which the number of electrodes used for the rotation of the mirror surface is doubled, that is, effective electrode area for the rotation of the mirror surface is doubled compared to conventional micromirror devices, by which a large tilt angle of the mirror surface can be achieved. In the micromirror device of the present invention, the aforementioned pull-in is avoided while ensuring the large tilt angle, by securing a sufficient space between the mirror surface and the electrodes of each substrate. Since the effective electrode area is enlarged as above, a wide scan range can be attained even if the voltage applied to each electrode is reduced to a low level.

In conventional micromirror devices, the mirror surface is rotated only by electrostatic attraction occurring between the mirror surface and an electrode placed on one side of the mirror surface. In other words, the mirror is rotated only by linear pulling force applied to one side of the mirror, by which the structure of the mirror layer is subject to damages caused by a heavy load. Meanwhile, in the present invention, the mirror surface is rotated around the first axis by applying voltage to a pair of electrodes placed diagonally with respect to the first axis. In the operation, both sides of the mirror surface is pulled upward and downward respectively, by which a substantially pure bending moment (rotation moment) can be given to the mirror surface efficiently. The structure of the mirror layer is released from a heavy load and thereby a longer operating life can be attained.

Further, in the above composition, the bias voltage is applied to both the upper and lower electrodes. Therefore, the displacement of the mirror surface can be avoided efficiently without the need of forming a supporting part like the pivot of the document No.2.

As described above, the micromrirror device of the present invention achieves a wide scan range while maintaining a small-sized and simple configuration even though the thickness slightly increases by that of the upper substrate.

Optionally, the pair of electrodes placed diagonally with respect to the first axis may be in a symmetrical relationship with respect to the center of the mirror surface. By such configuration, the voltage control of the electrodes becomes easier.

Still optionally, the mirror surface may be supported to be further rotatable at least around a second axis intersecting with the first axis at the center. In this case, the upper substrate further includes a third upper electrode and a fourth upper electrode arranged on the surface facing the mirror layer to face each other via a second upper boundary passing through the center of the surface and parallel to the second axis. The lower substrate further includes a third lower electrode and a fourth lower electrode arranged on the surface facing the mirror layer to face each other via a second lower boundary passing through the center of the surface and parallel to the second axis. The mirror surface can be rotated around the second axis by applying voltage to a pair of electrodes, of the third and fourth upper electrodes and the third and fourth lower electrodes, placed diagonally with respect to the second axis.

Still optionally, the pair of electrodes placed diagonally with respect to the second axis may be in a symmetrical relationship with respect to the center of the mirror surface, similarly to the pair of electrodes placed diagonally with respect to the first axis.

In the case of biaxial mirror rotation (i.e. two-dimensional scanning of the beam incident upon the mirror surface), by configuring the micromirror device to let the first and second axes intersect with each other at right angles, the control of mirror rotation can be simplified and facilitated.

In the case of the biaxial mirror rotation, the mirror layer may include a frame provided around the mirror surface, an outer frame provided around the frame, first hinge parts arranged along the first axis to connect the mirror surface and the frame, and second hinge parts arranged along the second axis to connect the frame with the outer frame.

Still optionally, the first and second spaces may be formed to have substantially the same heights. Especially when all the electrodes provided to the upper and lower substrates are in a symmetrical relationship with respect to the mirror surface, the equalization of the heights of the first and second spaces facilitates the voltage control since the voltages to be applied to the electrodes placed diagonally with respect to the rotation axis for the rotation of the mirror surface can be set substantially equal to each other.

Still optionally, the micromirror device is provided with a first spacer for forming the first space, and a second spacer for forming the second space.

When spacers for securing the first and second spaces are provided between the mirror layer and the upper and lower substrates, one of the spacers can be formed integrally with the mirror layer. Such composition allows the spacer to be formed simultaneously with the manufacture of the mirror layer by etching, etc., by which the manufacturing process of the whole micromirror device can be simplified.

While the tilt angle of the mirror surface can be increased by enlarging the electrodes as mentioned above, too large electrode area on the upper substrate causes blockage of the incident beam by the electrodes. In a particular case, the electrodes provided to the upper substrate may be formed as transparent electrodes.

In a particular case, the electrodes of the upper substrate may be placed at positions avoiding blockage of optical paths of the beam before being incident upon the mirror surface and after being deflected by the mirror surface. For example, the electrodes of the upper substrate may be arranged to form an annular shape letting the beam enter the central part of the upper substrate.

Incidentally, the manufacturing process of the micromirror device can be further simplified by giving compatibility to the substrates of the device. Therefore, it is preferable that the electrodes provided to the lower substrate be configured substantially the same as the electrodes of the upper substrate.

According to another aspect of the invention, there is provided a scanning confocal probe, which is provided with the micromirror device described above, a single mode optical fiber which guides the beam emitted from the light source while guiding the beam reflected by the tissue to a photoreceptor unit, a deflector which deflects the beam emerging from the single mode optical fiber toward the micromirror device, and a mounting substrate having transparency which is used for installing the micromirror device and the deflector along an optical path of the beam. The micromirror device and the deflector are mounted on opposite sides of the mounting substrate.

In such a scanning confocal probe to be inserted in a body cavity, the voltage applied to each electrode is desired to be set as low as possible. The micromirror device of the present invention is capable of achieving a wide scan range while reducing the voltage applied to each electrode to a low level as mentioned above. Therefore, the scanning confocal probe in accordance with the present invention realizes observation of a wide range while ensuring the safety.

It is also possible to utilize the upper substrate of the micromirror device as the aforementioned mounting substrate. Specifically, the upper substrate is designed larger (longer) than the mirror layer and the lower substrate, and the deflector is placed on a surface of the upper substrate opposite to the mirror layer. By such composition, relative positions of the micromirror device, the deflector and the single mode optical fiber forming the scanning confocal probe can be set easily.

BRIEF DESCRIPTION OF THE ACCOMPANYING DRAWINGS

FIG. 3 is a schematic diagram showing the cross-sectional configuration of a mirror layer of the micromirror device along an X axis;

FIG. 4A is a cross-sectional view of an upper substrate of the micromirror device taken along the line A—A shown in FIG. 2;

FIG. 4B is a bottom view of the upper substrate seen from the mirror layer's side;

FIG. 4C is a top view of the upper substrate seen from the light incident side;

DETAILED DESCRIPTION OF THE EMBODIMENTS

Figure 1:
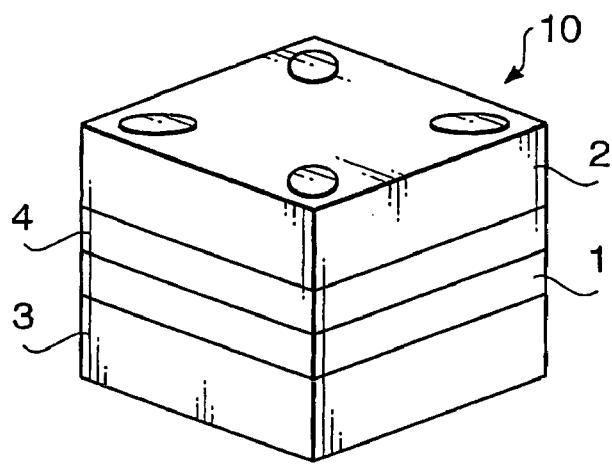
FIG. 1 is a perspective view showing the overall composition of a micromirror device in accordance with an embodiment of the present invention.
Figure 2:
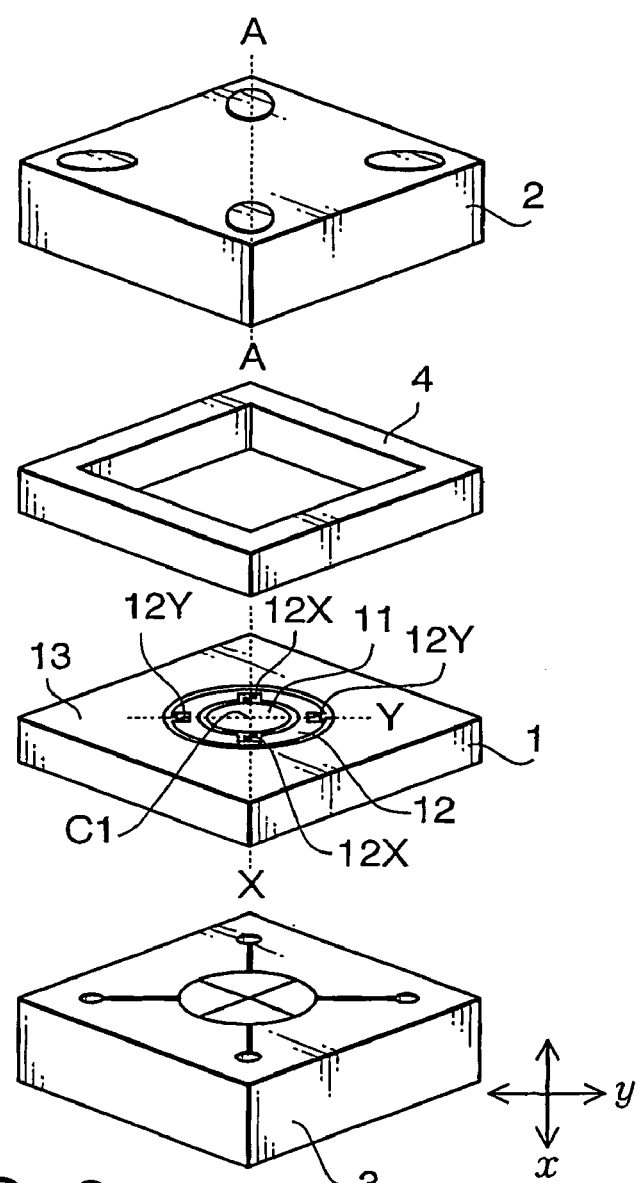
FIG. 2 is a perspective view showing components of the micromirror device in a disassembled state.

Referring now to the drawings, a description will be given in detail of a preferred embodiment in accordance with the present invention. FIG. 1 is a perspective view showing the overall configuration of a micromirror device 10 according to an embodiment of the present invention. As shown in FIG. 1, the micromirror device 10 is formed in a shape like a cuboid. FIG. 2 is a perspective view showing components of the micromirror device 10 in a disassembled state.

As shown in FIGS. 1 and 2, the micromirror device 10 includes an upper substrate 2 and a lower substrate 3 stacked up to sandwich a mirror layer 1. The upper substrate 2 is stacked on the mirror layer 1 via a spacer 4, and thus the micromirror device 10 includes the upper substrate 2, the spacer 4, the mirror layer 1 and the lower substrate 3 from its light incident side. In this description, part of the micromirror device 10 in the light incident side is defined as an "upper part" and the other part is defined as a "lower part" for the sake of convenience.

As shown in FIG. 2, the mirror layer 1 includes a circular mirror surface 11 placed in the central part of the mirror layer 1, a ring-shaped frame 12 placed to surround the periphery of the mirror surface 11, and an outer frame 13 formed to surround the frame 12. The frame 12 has a pair of hinge parts 12X arranged in a first direction (x direction) to sandwich the mirror surface 11 (hereinafter referred to as "first hinge parts 12X"). Each first hinge part 12X is joined to the mirror surface 11 at one end, while being joined to the frame 12 at the other end. Therefore, the first hinge parts 12X support the mirror surface 11 to be rotatable around an X axis in the x direction. The frame 12 is further provided with another pair of hinge parts 12Y arranged in a second direction (y direction) orthogonal to the x direction to sandwich the frame 12 (hereinafter referred to as "second hinge parts 12Y"). Each second hinge part 12Y is joined to the frame 12 at one end, while being connected to the outer frame 13 at the other end. Therefore, the second hinge parts 12Y support the frame 12 and the mirror surface 11 to be rotatable around a Y axis in the y direction. In FIG. 2, the X and Y axes are indicated with broken lines and the intersection of the two axes (the center of the mirror surface 11) is indicated with a reference character "C1".

The structure of the first and second hinge parts 12X and 12Y is not particularly limited. For example, a thin material alternately folded in directions orthogonal to each axis may be employed in this embodiment as each hinge part.

FIG. 3 is a schematic diagram showing the cross-sectional configuration of the mirror layer 1 shown in FIG. 2 along the X axis. As shown in FIG. 3, a protruded part 14 is provided to a peripheral part of the outer frame 13 facing the lower substrate 3 so as to protrude downward by a prescribed level difference compared with the central part where the mirror surface 11 is placed. The protruded part 14 is formed in order to secure a prescribed space (hereinafter referred to as a "lower space") between the mirror layer 1 and the lower substrate 3.

The mirror layer 1 configured as above is manufactured by processing an SOI (Silicon On Insulator) wafer by dry etching like RIE (Reactive Ion Etching) or various wet etching techniques. Specifically, the SOI wafer is composed of three layers: an active or device layer (Si), a box layer ($SiO_2$) and a handle layer (Si). By vapor-depositing a metal layer (Al, Au, etc.) or dielectric multiple layers on the surface of the active layer processed as shown in FIG. 3 by RIE, the mirror layer 1 having the mirror surface 11 of high reflectivity is obtained.

Next, the upper substrate 2 will be explained referring to FIGS. 4A through 4C. FIG. 4A is a cross-sectional view of the upper substrate 2 shown in FIG. 2 taken along the line A—A (diagonal line). FIG. 4B is a bottom view of the upper substrate 2 seen from the mirror layer's side. FIG. 4C is a top view of the upper substrate 2 seen from the light incident side.

The upper substrate 2 is prepared by processing a glass substrate 2a having sufficient transparency allowing a beam led from outside to be incident upon the mirror surface 11. As shown in FIGS. 4A and 4B, first through fourth drive electrodes T1–T4 are formed on a plane surface 2b of the upper substrate 2 facing the mirror layer 1. Each drive electrode T1–T4 is formed as a transparent electrode like an ITO (Indium-Tin-Oxide) film so as not to block the incidence of the beam upon the mirror surface 11. The drive electrodes T1–T4 are shaped into sector forms of the same size. Specifically, first and second drive electrodes T1 and T2 are placed to be symmetrical with each other with respect to a boundary passing through the center C2 of the upper substrate 2 and stretching in the y direction (first boundary, corresponding to the Y axis of the mirror layer 1). Third and fourth drive electrodes T3 and T4 are placed to be symmetrical with each other with respect to a boundary passing through the center C2 and stretching in the x direction (second boundary, corresponding to the X axis of the mirror layer 1).

As shown in FIGS. 4A and 4C, on a surface 2c of the upper substrate 2 opposite to the surface 2b facing the mirror layer 1, first through fourth wiring electrodes t1–t4 are formed so that voltage supplied from the outside of the micromirror device 10 can be applied to the drive electrodes T1–T4.

The glass substrate 2a is also provided with conducting parts 2d for electrically connecting the wiring electrodes t1–t4 to the drive electrodes T1–T4, respectively. Each conducting part 2d is formed by opening a through hole through the glass substrate 2a by sand blasting, etc. and filling the through hole with conductive material. The formation of the conducting part 2d (through hole) by sand blasting is only an example, and thus other techniques can also be used as long as the conducting part 2d (through hole) can be formed. By the above configuraton, voltage supplied from the outside of the micromirror device 10 can be applied to the drive electrodes T1–T4 via the conducting parts 2d.

The lower substrate 3 in this embodiment is configured to be the same as the upper substrate 2 which has been described above. By the common use of the same substrate configuration for the upper and lower substrates 2 and 3, costs can be reduced and efficiency of assembly work can be increased. Further, among the electrodes facing one another via the mirror layer 1 (mirror surface 11), those placed diagonally with respect to the X axis or the Y axis are in symmetrical relationship with each other with respect to the center C1 of the mirror surface 11. Therefore, the electrostatic forces produced when a predetermined voltage is applied to the electrodes become substantially the same.

The spacer 4 is provided in order to secure a prescribed space (hereinafter referred to as an "upper space") between the upper substrate 2 and the mirror layer 1. Specifically, the spacer 4 is made of silicon to have substantially the same height as the protruded part 14 of the mirror layer 1. In other words, in the micromirror device 10 of this embodiment, the upper space secured by the spacer 4 has substantially the same height as the lower space secured by the protruded part 14. Therefore, electrostatic forces applied to the mirror surface 11 when a certain voltage is applied to the electrodes T1 to T4 become substantially the same, and thus application of bias voltage causes no displacement of the mirror surface 11.

In the stacking of the components 1 to 4, various joining techniques can be used. In this embodiment, the components 1 to 4 are joined together by anode junction. Since the spacer 4 and the mirror layer 1 (both made of silicon) can not be joined directly by anode junction, a thin glass layer is placed between the spacer 4 and the mirror layer 1 and the two layers are joined together by anode junction via the glass layer. Incidentally, an error in the height of the upper space caused by the glass layer has no effect in practical use since the glass layer is far thinner than each component 1–4.

In cases where the components 1–4 are vacuum-packaged in the last step of the manufacturing process of the micromirror device 10, the use of a spacer 4 made of Pyrex glass is desirable. Parts that can not be joined together by anode junction may also be joined by use of polyimide adhesives like Photoneece.

Figure 5A:
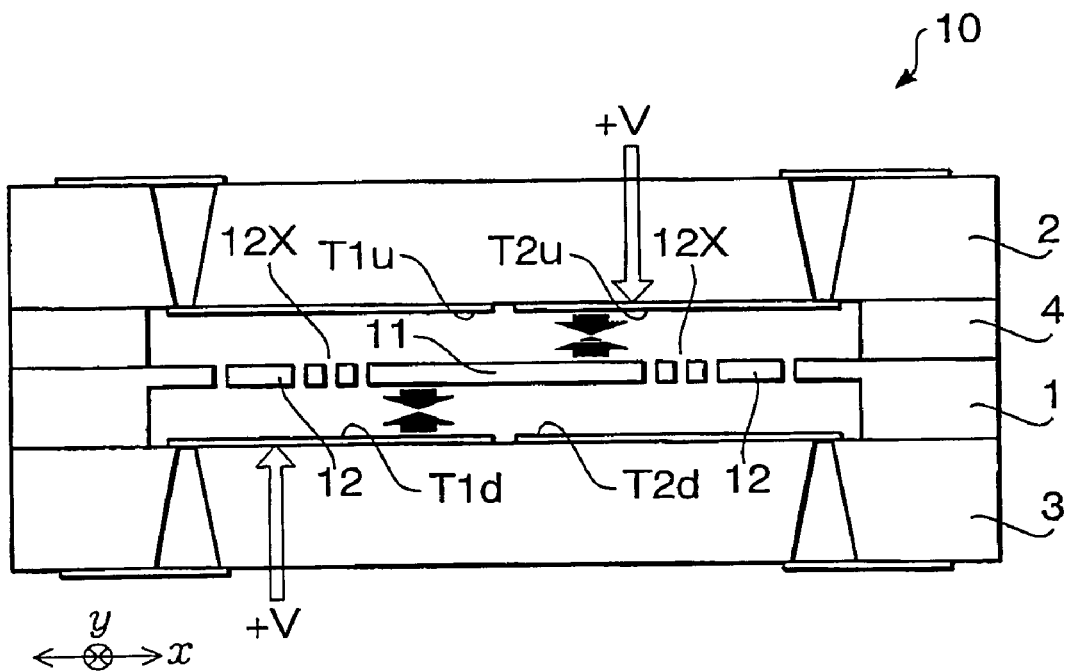
FIG. 5A is a cross-sectional view of the micromirror device taken along a plane containing the X axis and the line A—A of FIG. 2, showing the status of the device before the application of voltage to drive electrodes.
Figure 5B:
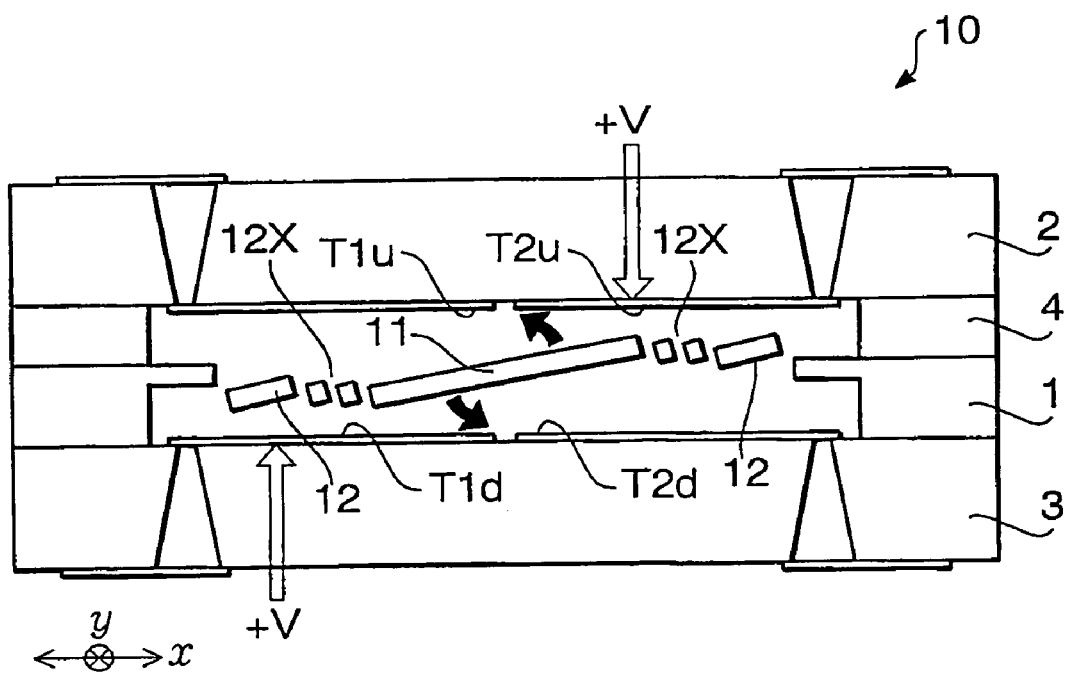
FIG. 5B is a cross-sectional view of the micromirror device taken along a plane containing the X axis and the line A—A of FIG. 2, showing the status of the device with a prescribed voltage applied to drive electrodes.

The principle of operation of the micromirror device 10 configured as above will be explained below referring to FIGS. 5A and 5B. The mirror layer 1 shown in FIGS. 5A and 5B has the same configuration as that shown in FIG. 3. Thus, FIGS. 5A and 5B are cross-sectional views of the micromirror device 10 taken along a plane containing the X axis and the line A—A shown in FIG. 2, in which FIG. 5A shows the status of the micromirror device 10 before the application of voltage to drive the electrodes and FIG. 5B shows the status of the micromirror device 10 with a prescribed voltage applied to drive electrodes. In FIGS. 5A and 5B, for discriminating between the drive electrodes T1–T4 provided to the upper substrate 2 and the lower substrate 3, drive electrodes of the upper substrate 2 are referred to as "upper drive electrodes T1u–T4u" while those of the lower substrate 3 are referred to as "lower drive electrodes T1d–T4d" for the sake of convenience.

To rotate the mirror surface 11 around the Y axis, a prescribed voltage (+V) is applied to a lower drive electrode T1d and an upper drive electrodes T2u as shown in FIG. 5A. By the application of the voltage, electrostatic force (attraction) is caused between the mirror surface 11 and each drive electrode T1d, T2u as indicated by solidly shaded arrows in FIG. 5A, by which the mirror surface 11 and the frame 12 rotate around the Y axis formed by a pair of second hinge parts 12Y (see FIG. 2) as shown in FIG. 5B. To rotate the mirror surface 11 around the Y axis in a direction opposite to FIG. 5B, the prescribed voltage (+V) is applied to a lower drive electrode T2d and an upper drive electrodes T1u.

As above, the micromirror device 10 of this embodiment rotates the mirror surface 11 (and the frame 12) around the Y axis by simultaneously applying the same voltage to a pair of drive electrodes T1d and T2u or a pair of drive electrodes T2d and T1u which are placed diagonally with respect to the Y axis. Each electrostatic force caused by the application of voltage is applied to the mirror surface 11 substantially as a pure bending moment, as indicated by solidly shaded arrows in FIG. 5B. Therefore, the load on the second hinge parts 12Y and the mirror surface 11 in regard to the mirror rotation can be reduced compared to a conventional micromirror device.

Further, by the provision of the drive electrodes to both of the upper substrate 2 and the lower substrate 3, a large electrode area can be achieved for the mirror rotation. Moreover, sufficient spaces (the upper space, the lower space) are secured by the spacer 4 and the protruded part 14 of the mirror layer 1. Therefore, by the micromirror device 10 according to the embodiment of the present invention, a large tilt angle is secured even if the voltage applied to each electrode is reduced to a low level.

The above is the principle of operation of the micromirror device 10 of this embodiment. Incidentally, while only the rotation of the mirror surface 11 around the Y axis has been described above, the rotation of the mirror surface 11 around the X axis is also accomplished by substantially the same principle, except for the following points. In the rotation around the X axis, the voltage is applied to a pair of drive electrodes (an upper drive electrode T3u and a lower drive electrode T4d, or an upper drive electrode T4u and a lower drive electrode T3d) which are placed diagonally with respect to the X axis. Since the first hinge parts 12X serve as the rotation axis, the frame 12 does not rotate in this case.

Figure 6:
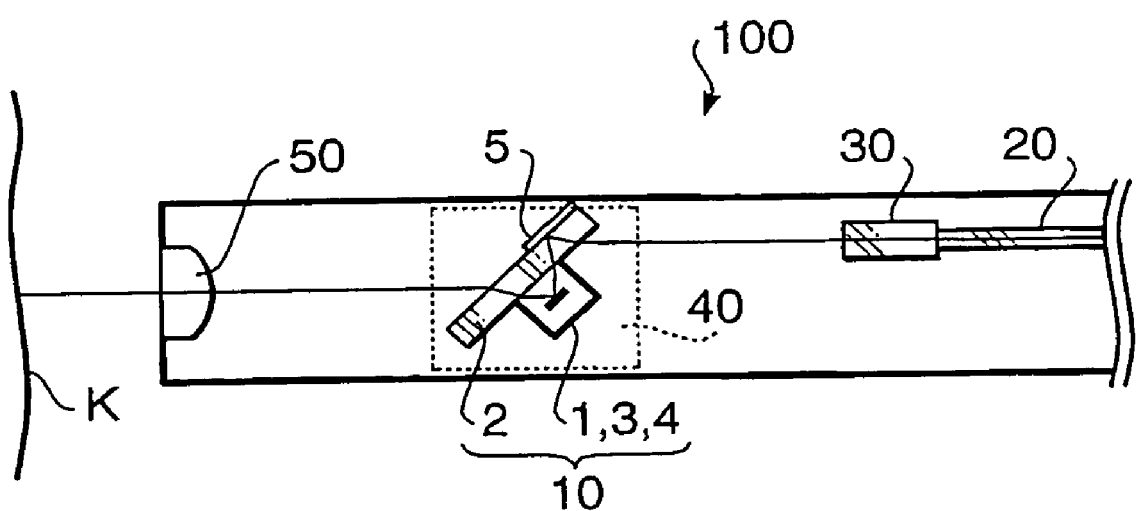
FIG. 6 is a schematic diagram showing the basic composition of a scanning confocal probe equipped with the micromirror device of the embodiment.

The micromirror device 10 described above can be used suitably as a laser beam scanning unit of a scanning confocal probe, for example. FIG. 6 is a schematic diagram showing a basic configuration of a scanning confocal probe 100 which is equipped with the micromirror device 10 of this embodiment.

As shown in FIG. 6, the scanning confocal probe 100 includes an optical fiber 20, a GRIN (GRadient INdex) lens 30, a deflecting system 40 and an objective lens 50.

The optical fiber 20 is a single mode fiber which transmits light in a single mode. The optical fiber 20 receives an optical beam emitted by an unshown light source and guides the beam to the GRIN lens 30. The GRIN lens 30 functions as a collimator lens for collimating the beam emerging from the optical fiber 20. The collimated beam emitted from the GRIN lens 30 is incident upon the deflecting system 40.

The deflecting system 40 includes the aforementioned micromirror device 10 and a mirror part (i.e. a deflector) 5 which deflects the incident beam to the micromirror device 10.

In conventional scanning confocal probes, the micromirror device and the mirror part are manufactured separately and thereafter mounted on the scanning confocal probe while being registered with (positioned relative to) each other via a mounting substrate having transparency. Therefore, very high accuracy is required not only in the registration of the micromirror device with the mirror part but also in optical path matching with other members in the mounting process. Under such circumstances, deterioration of manufacturing efficiency has been pointed out.

Meanwhile, in the micromirror device 10 of this embodiment, the upper substrate 2 (specifically, the glass substrate 2a) is designed to be larger than the other components 1, 3 and 4 as shown in FIG. 6, that is, the upper substrate 2 is formed to serve as the aforementioned mounting substrate. The mirror part 5 is formed on a surface of the upper substrate 2 opposite to a surface facing the mirror layer 1 (surface nearer to the objective lens 50). By forming the deflecting system 40 as a single unit as above, the registration of the micromirror device 10 with the mirror part 5 becomes unnecessary, and the optical path matching with other members 20, 30 and 50 in the mounting on the scanning confocal probe 100 is also facilitated.

In the deflecting system 40, the collimated beam is incident upon the mirror layer 1 (specifically, the mirror surface 11) of the micromirror device 10 via the mirror part 5 and the upper substrate 2. The collimated beam reflected by the mirror layer 1 irradiates a living tissue K in a body cavity while being converged by the objective lens 50. Meanwhile, the mirror surface 11 rotates around the X axis or the Y axis according to the aforementioned principle of operation, by which the living tissue K is scanned by the beam two-dimensionally.

The beam reflected by the living tissue K proceeds reversely on the above optical path and is guided by the optical fiber 20 to a photoreceptor. In this process, the end face of the optical fiber 20 functions as a pinhole, that is, only reflected light from a focal plane of the objective lens 50 on the object side enters the optical fiber 20 through the end face.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, the following modifications can also achieve effects similar to those of the above embodiment.

In the micromirror device 10 of the above embodiment, all the drive electrodes provided to the upper substrate 2 and the lower substrate 3 are arranged to be symmetrical with respect to the center C1 of the mirror surface 11 from the viewpoint of easy voltage control. Further, the upper space and the lower space are designed to have equal heights in order to equalize electrostatic attraction applied to the mirror surface 11 due to application of a prescribed voltage (bias voltage) to each electrode. However, if a controller in charge of the voltage control is capable of more flexible voltage control and ill effect on the controller is negligible, the shape and size of each electrode, the height of each space, etc. can be designed to be different. In this case, effects similar to those of the above embodiment can be obtained by letting the controller change the voltage applied to each electrode in accordance with the shape and size of each electrode, the height of each space, etc. It is also possible to compensate for individual differences (manufacturing error, etc.) of the electrodes by the adjustment of the voltage applied to each electrode.

While a biaxial micromirror device 10 (capable of rotating the mirror surface 11 around two axes) has been described in the above embodiment as the most frequently used type, the micromrirror device 10 according to the present invention is not restricted to the biaxial type but can be uniaxial, triaxial, or more. While a configuration in which the two axes (X axis, Y axis) intersect at right angles has been explained above as a configuration allowing easiest control, the axes do not necessarily have to be orthogonal.

While the mirror layer 1 is integrally provided with the protruded part 14 for securing the lower space in the above embodiment, the way of securing the space can be different. For example, the lower space may be secured by an independent spacer like the spacer 4 for the upper space, instead of forming the protruded part 14.

In the above embodiment, the electrodes on the upper substrate 2 are formed as transparent electrodes. However, if the electrodes of the upper substrate 2 are placed at positions avoiding blockage of optical paths of the beam before being incident upon the mirror surface 11 and after being deflected by the mirror surface 11, the electrodes need not to be transparent. For example, the drive electrodes of the upper substrate 2 may be arranged to form an annular shape around the area interfering with the optical paths.

As described above, in accordance with the present invention, the electrodes for rotating the mirror surface are arranged both above and below the mirror surface, by which a micromirror device achieving a large tilt angle of the mirror surface (i.e. a wide scan range) while remaining small-sized can be provided. The micromirror device, requiring no special structure for preventing the displacement of the mirror surface, etc., can be manufactured with ease and at a low cost.

A substrate of the micromirror device of the present invention can be used as a mounting substrate of a scanning confocal probe, by which positioning of the micromirror device relative to other members in the probe can be made easily.

The micromirror device according to the present invention is capable of achieving a wide scan range even when the voltage applied to each electrode is low. Therefore, the micromirror device is suitable not only for optical switches, measuring instruments, scanners, etc. (technical fields where micromirror devices are currently used) but also for medical applications (the aforementioned scanning confocal probe, etc.).

The present disclosure relates to the subject matter contained in Japanese Patent Application No. P2004-012237, filed on Jan. 20, 2004, which is expressly incorporated herein by reference in its entirety.

What is claimed is:

1. A scanning confocal probe for obtaining observation images of a tissue in a body cavity by scanning a beam emitted by a light source on the tissue, comprising:
   a micromirror device, comprising:
      a mirror layer including a mirror surface which is supported to be rotatable around a first axis passing through a center of the mirror surface;
      an upper substrate having transparency including a first upper electrode and a second upper electrode arranged on its surface facing the mirror layer to face each other via a first upper boundary passing through a center of the surface and parallel to the first axis, the upper substrate being stacked on one side of the mirror layer while securing a first space between the center of the mirror surface and the first and second upper electrodes; and
      a lower substrate including a first lower electrode and a second lower electrode arranged on its surface facing the mirror layer to face each other via a first lower boundary passing through a center of the surface and parallel to the first axis, the lower substrate being stacked on the other side of the mirror layer while securing a second space between the center of the mirror surface and the first and second lower electrodes,
      wherein the mirror surface is rotated around the first axis by applying voltage to a pair of electrodes, of the first and second upper electrodes and the first and second lower electrodes, placed diagonally with respect to the first axis;
   a single mode optical fiber which guides the beam emitted from the light source while guiding the beam reflected by the tissue to a photoreceptor unit;
   a deflector which deflects the beam emerging from the single mode optical fiber toward the micromirror device; and a mounting substrate having transparency which is used for installing the micromirror device and the deflector along an optical path of the beam, wherein the micromirror device and the deflector are mounted on opposite sides of the mounting substrate.

2. A scanning confocal probe according to claim 1, wherein the mounting substrate is implemented by the upper substrate of the micromirror device.

* * * * *